Nov. 8, 1966 M. S. LEVIN ETAL 3,284,083
SWITCH ACTUATED MULTIVIBRATOR CHANCE DEVICE
Filed March 26, 1964
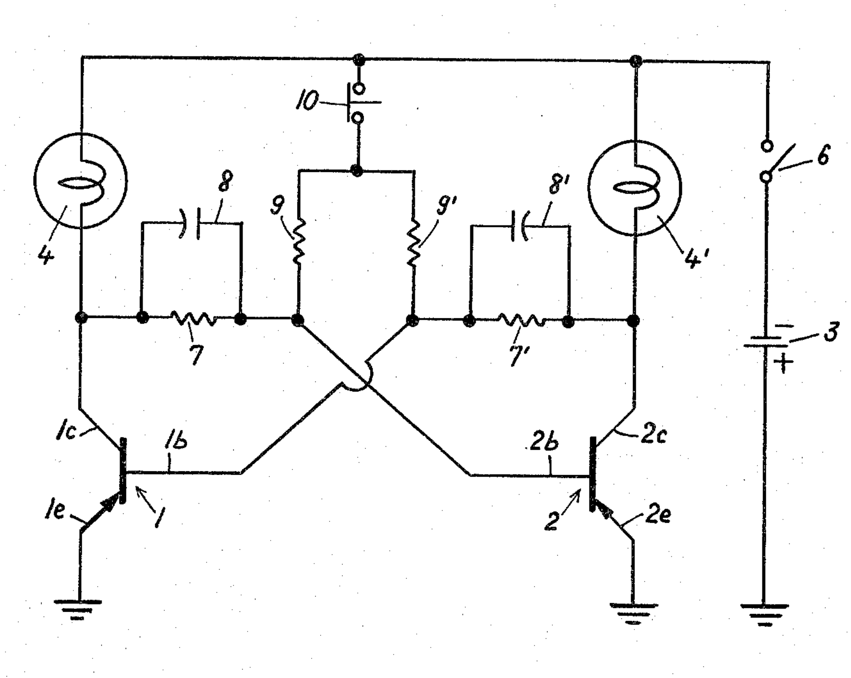
INVENTORS
MORTON S. LEVIN AND
JAMES Q. MALOY
BY Edward V. Connors
ATTORNEY United States Patent Office 3,284,083
Patented Nov. 8, 1966

3,284,083
SWITCH ACTUATED MULTIVIBRATOR CHANCE DEVICE

Morton S. Levin, Woodcliff Lake, and James Q. Maloy, Clifton, N.J., assignors to Martin Schnur and Mel Appel, doing business as Schnur-Appel, Short Hills, N.J.

Filed Mar. 26, 1964, Ser. No. 354,911
6 Claims. (Cl. 273—138)

This invention relates to the field of entertainment, and more particularly to an electronic device able to indicate one of two decisions or answers in a random manner.

The device may be used, for example, in board games in which the player may have a choice of whether or not to move, or whether to move once or twice. By pressing an interrogatory switch an indication is given to the player as whether or not to move.

In accordance with the invention an electronic circuit is provided including a switch which is pressed to interrogate the device and causes it to indicate an answer which, as stated before, will be one of two alternatives. The electronic circuit is an astable oscillatory circuit which is converted into a bistable circuit by the operation of the interrogation switch.

An object of the invention is to provide an entertainment device which is simple and economical in manufacture, efficient in operation, and durable in use.

Referring to the drawings there is shown in FIGURE 1 a free running multivibrator including transistors 1 and 2 each having a base, an emitter and a collector indicated as 1*b*, 1*e*, 1*c*, 2*b*, 2*e*, and 2*c*. The emitters 1*e* and 2*e* are connected to one side of a source of electric current such as battery 3. The collectors 1*c* and 2*c* are connected through indicating means such as incandescent lamps 4 and 4′ through an on and off switch 6 to the other side of the source of current 3.

A timing circuit is connected from the base of each of the transistors 1 and 2 to the collector of the other transistor, the timing circuits including resistances 7 and 7′ and capacitors 8 and 8′, the resistance and capacitance for each timing circuit being connected in parallel. Biasing resistors 9 and 9′ are connected between the bases of each of the transistors 1 and 2 to said one side of a single pole switch 10, the other side of the switch 10 being connected through the switch 6 to the source of current 3.

In the operation of the device with the switches 6 and 10 closed, the circuit operates as a free running multivibrator. If we assume that transistor 2 is ON and transistor 1 is OFF current flows through resistor 9′ and capacitor 8′ in a direction which would tend to apply a voltage to the base 1*b* of transistor 1 to turn transistor 1 into the ON condition. When the potential at the base 1*b* of transistor 1 reaches the turn on level causing a current flow through the collector 1*c* of transistor 1 a regenerative oscillation is started. As the collector 1*c* of the transistor 1 starts moving in a positive direction the capacitor 8 tends to drive the base 2*b* of transistor 2 into the positive direction. This results in a decrease in the current flow through the collector 2*c* of the transistor 2 and hence a negative going potential at that point. This negative going potential is reflected through the capacitor 8′ to the base 1*b* of transistor 1 and hence tends to turn it on even further. This regenerative process continues until the transistor 1 has been turned fully on and the transistor 2 has been cut completely off. At this point the base 2*b* of the transistor 2 starts to move in a negative direction as the capacitor 8 charges through the resistor 9 and the entire process is repeated in the opposite direction.

So far described is the circuit operation in the astable mode. This mode continues as long as the switch 10 remains closed. The frequency of the free running astable multivibrator is approximately ten kilocycles and the duty cycle is approximately fifty percent for each transistor. The approximate ten kilocycle frequency causes the period of time that the current flows through each lamp for each cycle to be small as compared to the variation in the reaction time of a person. The fifty percent duty cycle results in a visual display in which both lamps 4 and 4′ appear to be glowing continuously at a reduced intensity.

When the switch 10 is opened breaking the bias current path which has been causing the astable multivibrator action, the circuit is left in a bistable condition. Which ever transistor had been turned ON at the moment that the switch 10 was opened will remain ON as long as the switch 10 is left in the open condition. If at the moment the switch 10 was opened the transistor 2 had been turned ON the fact that its saturation voltage was lower than the required turned on voltage at the base of transistor 1 would result in the transistor 1 remaining OFF, the resistor 7′ being of a small enough value so that leakage current from the base 1*b* of the transistor 1 cannot cause it to turn ON. If the transistor 2 were ON in the stable situation the lamp 4′ would glow at full brightness, and since the transistor 1 was turned off the lamp 4 would be completely dark. If the transistor 1 were ON at the instant switch 10 is opened lamp 4 would glow at full brightness, and since the transistor 2 was turned off the lamp 4′ would be completely dark. When the switch 10 is again closed the circuit reverts to its astable mode. The fact that the period of time each lamp is excited for each cycle is small compared to the variation of the reaction time of a person causes it to be impossible for an operator to press the switch 10 at such time to predict which transistor 1 or 2 will be turned on at the instant the switch 10 is operated. The choice which lamp will glow full brightness and which lamp will be dark is determined only by the instant the interrogation switch 10 is operated and cannot be predetermined by the operator.

In a commercial embodiment of the invention circuit constants found satisfactory were as follows:

| | | |
|---|---|---|
| Resistances **7** and **7′** | ohms | 56 |
| Resistances **9** and **9′** | do | 100 |
| Capacitances **8** and **8′** | microfarads | 1.0 |
| Transistors **1** and **2** | | 2N404 |
| Lamps **4** and **4′** | | GE #49 |
| Battery **3** | volts | 1.5 |

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

We claim:

1. An entertainment device comprising a free running multivibrator including a pair of transistors, a source of electric current, the multivibrator normally oscillating under the effect of the electric current, a pair of indicating means each responsive to ON-OFF condition of one of the transistors, the multivibrator including biasing means, and interrogation switch means connected in the biasing means circuit and adapted to be actuated for the interruption thereof thereby converting the free running multivibrator to a bistable multivibrator, the indicating means showing one or the other of the transistors in the ON position at the moment of opening of the switch.

2. An entertainment device comprising a free running multivibrator including a pair of transistors, a source of electric current, the multivibrator normally oscillating under the effect of the electric current, a pair of indicating lamps each responsive to ON-OFF condition of one of the transistors, the multivibrator including biasing means, and interrogation switch means connected in the biasing means circuit and adapted to be actuated for the interruption thereof thereby converting the free running multivibrator to a bistable multivibrator, the indicating lamps showing one or the other of the transistors in the ON position at the moment of opening of the switch.

3. An entertainment device comprising a free running multivibrator including a pair of transistors each having a base, an emitter, and a collector, a timing circuit connected from the base of each transistor to the collector of the other transistor, a source of electric current, indicating means connected between the collector of each transistor and one side of the source of current, an interrogation switch, the base of each transistor connected through a resistor to one pole of the interrogation switch, the other pole of the interrogation switch connected to said one side of the source of current, and means connecting the emitters of both transistors to the other side of the current source, whereby when the interrogation switch is opened the free running multivibrator is stopped and remains in a bistable state at its condition at the moment of opening of the switch, one or the other of the indicating means showing one or the other of the transistors in the ON position.

4. An entertainment device comprising a free running multivibrator including a pair of transistors each having a base, an emitter, and a collector, a timing circuit connected from the base of each transistor to the collector of the other transistor, a source of electric current, an indicating lamp connected between the collector of each transistor and one side of the source of current, an interrogation switch, the base of each transistor connected through a resistor to one pole of the interrogation switch, the other pole of the interrogation switch connected to said one side of the source of current, and means connecting the emitters of both transistors to the other side of the current source, whereby when the interrogation switch is opened the free running multivibrator is stopped and remains in a bistable state at its condition at the moment of opening of the switch, one or the other of the indicating lamps showing one or the other of the transistors in the ON position.

5. An entertainment device comprising a free running multivibrator including a pair of transistors each having a base, an emitter, and a collector, a timing circuit connected from the base of each transistor to the collector of the other transistor, each timing circuit including a resistance and a capacitance connected in parallel, a source of electric current, indicating means connected between the collector of each transistor and one side of the source of current, an interrogation switch, the base of each transistor connected through a resistor to one pole of the interrogation switch, the other pole of the interrogation switch connected to said one side of the source of current, and means connecting the emitters of both transistors to the other side of the current source, whereby when the interrogation switch is opened the free running multivibrator is stopped and remains in a bistable state at its condition at the moment of opening of the switch, one or the other of the indicating means showing one or the other of the transistors in the ON position.

6. An entertainment device comprising a free running multivibrator including a pair of transistors each having a base, an emitter, and a collector, a timing circuit connected from the base of each transistor to the collector of the other transistor, each timing circuit including a resistance and a capacitance connected in parallel, an indicating lamp connected between the collector of each transistor and one side of the source of current, an interrogation switch, the base of each transistor connected through a resistor to one pole of the interrogation switch, the other pole of the interrogation switch connected to said one side of the source of current, and means connecting the emitters of both transistors to the other side of the current source, whereby when the interrogation switch is opened the free running multivibrator is stopped and remains in a bistable state at its condition at the moment of opening of the switch, one or the other of the indicating lamps showing one or the other of the transistors in the ON position.

References Cited by the Examiner

UNITED STATES PATENTS

| | | | |
|---|---|---|---|
| 2,776,420 | 1/1957 | Woll | 331—113 X |
| 2,893,733 | 7/1959 | O'Rourke | 273—138 X |
| 2,916,670 | 12/1959 | Pederson | 331—113 X |

RICHARD C. PINKHAM, *Primary Examiner.*

A. W. KRAMER, *Assistant Examiner.*